United States Patent
Gottlieb et al.

(10) Patent No.: US 10,837,562 B2
(45) Date of Patent: Nov. 17, 2020

(54) BALL VALVES WITH LATTICE STRUCTURES AND METHODS OF MANUFACTURE

(71) Applicant: Cameron International Corporation, Houston, TX (US)

(72) Inventors: Emanuel John Gottlieb, Upper Saint Clair, PA (US); Gopalakrishna Srinivasamurthy Magadi, The Woodlands, TX (US)

(73) Assignee: CAMERON INTERNATIONAL CORPORATION, Houston, TX (US)

( * ) Notice: Subject to any disclaimer, the term of this patent is extended or adjusted under 35 U.S.C. 154(b) by 0 days.

(21) Appl. No.: 15/835,084

(22) Filed: Dec. 7, 2017

(65) Prior Publication Data

US 2019/0178391 A1    Jun. 13, 2019

(51) Int. Cl.
| | |
|---|---|
| *F16K 5/06* | (2006.01) |
| *E21B 34/06* | (2006.01) |
| *F16K 21/08* | (2006.01) |
| *B33Y 80/00* | (2015.01) |
| *F16K 27/06* | (2006.01) |
| *B23K 26/342* | (2014.01) |
| *B22F 3/16* | (2006.01) |
| *B33Y 10/00* | (2015.01) |

(52) U.S. Cl.
CPC .......... *F16K 5/0621* (2013.01); *B23K 26/342* (2015.10); *B33Y 80/00* (2014.12); *E21B 34/06* (2013.01); *F16K 5/0605* (2013.01); *F16K 5/0657* (2013.01); *F16K 5/0689* (2013.01); *F16K 21/08* (2013.01); *F16K 27/067* (2013.01); *B22F 3/16* (2013.01); *B33Y 10/00* (2014.12); *E21B 2200/04* (2020.05)

(58) Field of Classification Search
CPC ...... F16K 5/0621; F16K 5/0689; F16K 21/08; F16K 27/067; F16K 5/0605; F16K 5/0657; B22F 3/16; B33Y 10/00; B33Y 80/00; E21B 34/06; E21B 2034/002; B23K 26/342
USPC ... 251/315.01–16, 127, 207, 315.01–315.16; 137/625.32
See application file for complete search history.

(56) References Cited

U.S. PATENT DOCUMENTS

| | | | | |
|---|---|---|---|---|
| 3,367,359 A | * | 2/1968 | Johnson | F16K 5/0657 137/375 |
| 3,484,079 A | * | 12/1969 | Reagan | F16K 5/0642 251/309 |
| 3,518,742 A | * | 7/1970 | Krosoczka | B23P 15/001 228/101 |
| 3,737,145 A | * | 6/1973 | Heller | F16K 27/067 251/309 |

(Continued)

FOREIGN PATENT DOCUMENTS

JP         11-148567       *  6/1999

*Primary Examiner* — John Bastianelli
(74) *Attorney, Agent, or Firm* — Michael L. Flynn; Fletcher Yoder, PC

(57) ABSTRACT

A ball for use within a ball valve includes an outer wall, an inner wall that defines a central bore, and a lattice structure positioned within an interior space defined between the outer wall and the inner wall. The ball may include one or more flow conditioners positioned within the central bore. The ball may be formed via an additive manufacturing process.

20 Claims, 12 Drawing Sheets

(56) References Cited

U.S. PATENT DOCUMENTS

| | | | | |
|---|---|---|---|---|
| 3,825,030 | A | * | 7/1974 | Kalsi .................... F16K 27/065 |
| | | | | 137/375 |
| 4,150,810 | A | * | 4/1979 | Laignel .................. F16K 27/06 |
| | | | | 251/309 |
| 5,236,176 | A | * | 8/1993 | Yeh ........................... F16K 5/06 |
| | | | | 251/315.16 |
| 5,680,889 | A | * | 10/1997 | Boger ........................ F16K 5/12 |
| | | | | 137/625.32 |
| 6,974,116 | B1 | * | 12/2005 | Christenson .......... F16K 5/0605 |
| | | | | 137/625.32 |
| 7,044,436 | B2 | * | 5/2006 | Corbetta ............... F16K 47/045 |
| | | | | 137/625.31 |
| 2016/0061381 | A1 | * | 3/2016 | Kotliar ................ B23K 15/0086 |
| | | | | 138/39 |
| 2016/0346626 | A1 | * | 12/2016 | Nurnberg ................ A63B 37/04 |
| 2017/0102089 | A1 | * | 4/2017 | Griffin, Jr. .............. B33Y 30/00 |
| 2017/0184086 | A1 | * | 6/2017 | Scancarello ........ F04B 39/0284 |

* cited by examiner

US 10,837,562 B2

BALL VALVES WITH LATTICE STRUCTURES AND METHODS OF MANUFACTURE

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Ball valves may be used to control a flow of fluid through a portion of a system, such as a mineral extraction system. The configuration of the components of ball valves can impact the ability of the ball valves to control the flow of fluid and can also impact installation or assembly processes. Therefore, it would be desirable to improve the configuration of the components of ball valves.

BRIEF DESCRIPTION OF THE DRAWINGS

Various features, aspects, and advantages of the present disclosure will become better understood when the following detailed description is read with reference to the accompanying figures in which like characters represent like parts throughout the figures, wherein.

DETAILED DESCRIPTION OF SPECIFIC EMBODIMENTS

Figure 1:
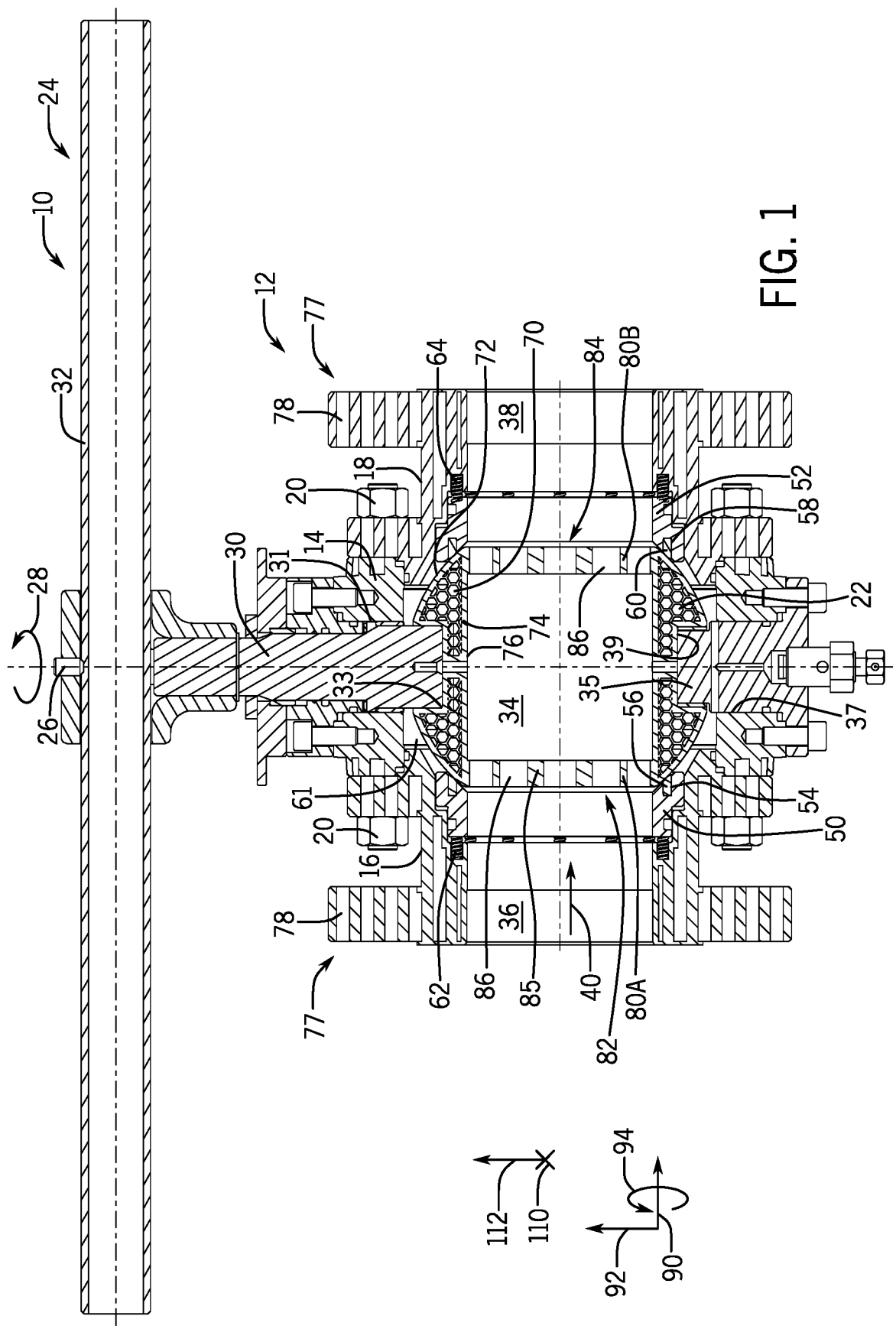
FIG. 1 is a cross-sectional side view of a ball valve, in accordance with an embodiment of the present disclosure.

One or more specific embodiments of the present disclosure will be described below. These described embodiments are only exemplary of the present disclosure. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Certain systems, such as mineral extraction systems (e.g., drilling and production systems), may include various fluid-handling components (e.g., valves and conduits). For example, some mineral extraction systems may include a ball valve having a ball that rotates between an open position to enable a flow of fluid and a closed position to block the flow of fluid. Such ball valves may be formed by machining a solid structure (e.g., metal block) into a generally spherical ball having a central bore, which is aligned with adjacent conduits when the ball valve is in the open position to enable the flow of fluid across the ball valve. Accordingly, the manufacturing process may be lengthy and complex. Furthermore, the ball may be a solid, heavy component, which in turn, may make assembly, transport, and installation of the ball valve challenging.

The disclosed embodiments relate to ball valves having components (e.g., the ball, a body, a closure) formed with a lattice structure (e.g., open cell structure, non-solid structure, non-continuous structure, or framework). For example, the lattice structure may be provided on an interior portion of the ball (e.g., between an outer wall of the ball and an inner wall that defines the bore). The lattice structure may reduce the weight of the component (e.g., as compared to solid components manufactured via traditional techniques), thereby facilitating assembly, transport, and installation of the ball valve. For example, in some embodiments, a ball having a lattice structure may weigh at least 10, 20, 30, 40, or 50 percent less than the ball without the lattice structure (e.g., solid ball).

The disclosed embodiments also relate to ball valves having one or more flow conditioners (e.g., plates, tubes, or vanes) positioned within the bore of the ball to adjust a flow profile of the fluid, which in turn may enable more accurate measurements by downstream flow meters, for example. The one or more flow conditioners within the bore may also stabilize and/or add strength to the ball. In some embodiments, the one or more flow conditioners may be integrally formed with the ball (e.g., is not coupled to the ball via a separate fastener, such as a pin, screw, or weld), and thus, is manufactured and installed with the ball and also remains stationary relative to the ball during operation of the ball valve.

In certain embodiments, the lattice structure and the one or more flow conditioners may be manufactured via additive manufacturing techniques. Such techniques may enable construction of the complex components from computer models, without difficult machining steps. In general, additive manufacturing techniques involve applying a source of energy, such as a laser or electron beam, to deposited feedstock (e.g., powder or wire) in order to grow a part having a particular shape and features. The ball valve disclosed herein may be utilized as part of any suitable fluid-handling system, such as an energy-acquisition or processing system (e.g., a hydrocarbon-production or processing system, such as a subsea or surface oil or gas well, a pipeline, a natural-gas processing terminal, a refinery, or a natural-gas powered electrical plant).

Turning now to the figures, FIG. 1 is a cross-sectional side view of a ball valve 10, in accordance with an embodiment. The ball valve 10 includes a housing 12, which may be formed by a body 14 (e.g., annular body), an upstream closure 16 (e.g., annular flange), and a downstream closure 18 (e.g., annular flange). As shown, the upstream closure 16 and the downstream closure 18 are coupled on opposite sides of the body 14 via respective fasteners 20 (e.g., threaded fasteners).

The ball valve 10 includes a ball 22 configured to rotate (e.g., approximately 90 degrees) between the illustrated open position 24 and a closed position about a rotational axis 26, as shown by arrow 28. The ball 22 is coupled to a stem 30, such that rotation of the stem 30 (e.g., via a handle 32 that may be operated manually, or via a hydraulic or pneumatic or electronic actuator) causes the ball 22 to rotate. In the illustrated embodiment, the stem 30 extends through a first opening 31 (e.g., thru-hole) formed in the body 14 and engages a first recess 33 formed in the ball 22. Additionally, a trunnion 35 extends through a second opening 37 formed in the body 14 and engages a second recess 39 formed in the ball 22.

In the open position 24, the ball 22 enables fluid flow across the ball valve 10. As shown, in the open position 24, a bore 34 (e.g., central bore) of the ball 22 is aligned with an upstream bore 36 defined in the upstream closure 16 and a downstream bore 38 defined in the downstream closure 18 to enable fluid flow across the ball valve 10 (e.g., from the upstream bore 36 to the downstream bore 38). Thus, when the ball valve 10 is in the open position 24, a fluid 40 (e.g., liquid or gas, production fluid, drilling fluid) may enter through the upstream housing 12 and exit through the downstream housing 14. In the closed position, the bore 34 of the ball 22 is generally perpendicular to the upstream bore 36 and the downstream bore 38, such that fluid is blocked from flowing through the ball valve 10. As used herein, the terms upstream and downstream are defined with respect to a flow path of the fluid 40. For example, in the illustrated embodiment, the upstream closure 16 is upstream from the downstream closure 18 because the fluid 40 flows from the upstream closure 16 toward the downstream closure 18. It should be understood that in certain embodiments the flow path of the fluid 40 may be in an opposite direction.

As illustrated in FIG. 1, the ball valve 10 also includes an upstream seat assembly 50 (e.g., an upstream annular seat assembly or a first annular seat assembly) positioned between the ball 22 and the upstream closure 16, and a downstream seat assembly 52 (e.g., a downstream annular seat assembly or a second annular seat assembly) positioned between the ball 22 and the downstream closure 18. In certain embodiments, the seat assemblies 50, 52 may have the same configuration and may be used interchangeably. As discussed in more detail below, the upstream seat assembly 50 may include a seat body 54 (e.g., annular seat body) and a seal 56 (e.g., annular seal or lip seal), and the downstream seat assembly 52 may include a seat body 58 (e.g., annular seat body) and a seal 60 (e.g., annular seal or lip seal). In certain embodiments, one or more upstream biasing members 62 bias the seat body 54 of the upstream seat assembly 50 toward the ball 22, and one or more downstream biasing members 64 bias the seat body 58 of the downstream seat assembly 52 toward the ball 22. In some embodiments, the seat assemblies 50, 52 may be configured to move (e.g., axially) relative to the housing 12 and/or the ball 22 and may enable the ball 22 to move (e.g., axially) relative to the housing 12 in response to pressure differentials across various components within the ball valve 10.

The ball valve 10 disclosed herein may be utilized in single block and bleed (SBB) configurations and/or in double block and bleed (DBB) configurations. In SBB configurations, when the ball valve 10 is in the closed position, the upstream bore 36 is pressurized and the downstream bore 38 is unpressurized. Thus, the upstream seat assembly 50 seals against the ball 22 of the ball valve 10. In DBB configurations, when the ball valve 10 is in the closed position, both the upstream bore 36 and the downstream bore 38 are pressurized. Thus, both the upstream seat assembly 50 and the downstream seat assembly 52 seal against the ball 22 of the ball valve 10, and the seat assemblies 50, 52 adjust to automatically relieve pressure within a cavity 61 defined by the housing 12 and located between the seat assemblies 50, 52.

As discussed in more detail below, the ball 22 may include a lattice structure 70 (e.g., open cell structure, non-solid structure, non-continuous structure, or framework). The lattice structure 70 may extend throughout an interior portion of the ball 22 and may contact and extend between an outer wall 72 (e.g., solid wall, radially-outer annular wall, or spherical segment) and an inner wall 74 (e.g., solid wall, radially-inner annular wall, cylindrical wall). Thus, the lattice structure 70 forms a bridge that couples the outer wall 72 to the inner wall 74. As shown, the seals 56, 60 seal against the outer wall 72, and the inner wall 74 defines the bore 34 and has an inner surface 76 (e.g., radially-inner annular surface) that contacts the fluid 40.

As shown, the upstream closure 16 and the downstream closure 18 may include a lattice structure 77 (e.g., open cell lattice structure, non-solid structure, or non-continuous structure). The lattice structures 70, 77 may have any of a variety of forms. For example, in the ball valve 10 of FIG. 1, the lattice structure 70 of the ball 22 includes a hexagonal lattice structure, while the lattice structure 77 of the closures 16, 18 includes openings 78 (e.g., through holes) that extend along an axial axis 90 of the ball valve 10.

One or more flow conditioners 80 (e.g., plates, vanes, or tubes) may be positioned within the bore 34 of the ball 22. For example, in the illustrated embodiment, a first flow conditioner 80A is positioned at an upstream end 82 (e.g., edge or end portion) of the bore 34, and a second flow conditioner 80B is positioned at an upstream end 84 (e.g., edge or end portion) of the bore 34. The illustrated flow conditioners 80A, 80B are plates 85 (e.g., flat plates) with multiple openings 86 (e.g., through holes). In some embodiments, the one or more flow conditioners 80 may be integrally formed with the ball 22 (e.g., without the use of a fastener, such as a pin, screw, or weld). Such a configuration may expedite assembly and installation of the one or more flow conditioners 80, while also blocking movement of the one or more flow conditioners 80 relative to the ball 22 during operation of the ball valve 10. For example, an operator does not need to install the ball valve 10 and then carry out a separate step to install the one or more flow conditioners 80. Furthermore, once assembled, there are no fasteners that might become dislodged and result in movement of the one or more flow conditioners 80 relative to the ball 22. However, it should be appreciated that the one or more flow conditioners 80 may be coupled to the ball 22 via one or more fasteners, in some embodiments. To facilitate discussion, the ball valve 10 and the components therein may be described with reference to the axial axis or direction 90, a radial axis or direction 92, and/or a circumferential axis or direction 94. The ball valve 10 and the components therein may further be described with references to a lateral axis 110 and a vertical axis 112 that are perpendicular to the axial axis 90.

Figure 2:
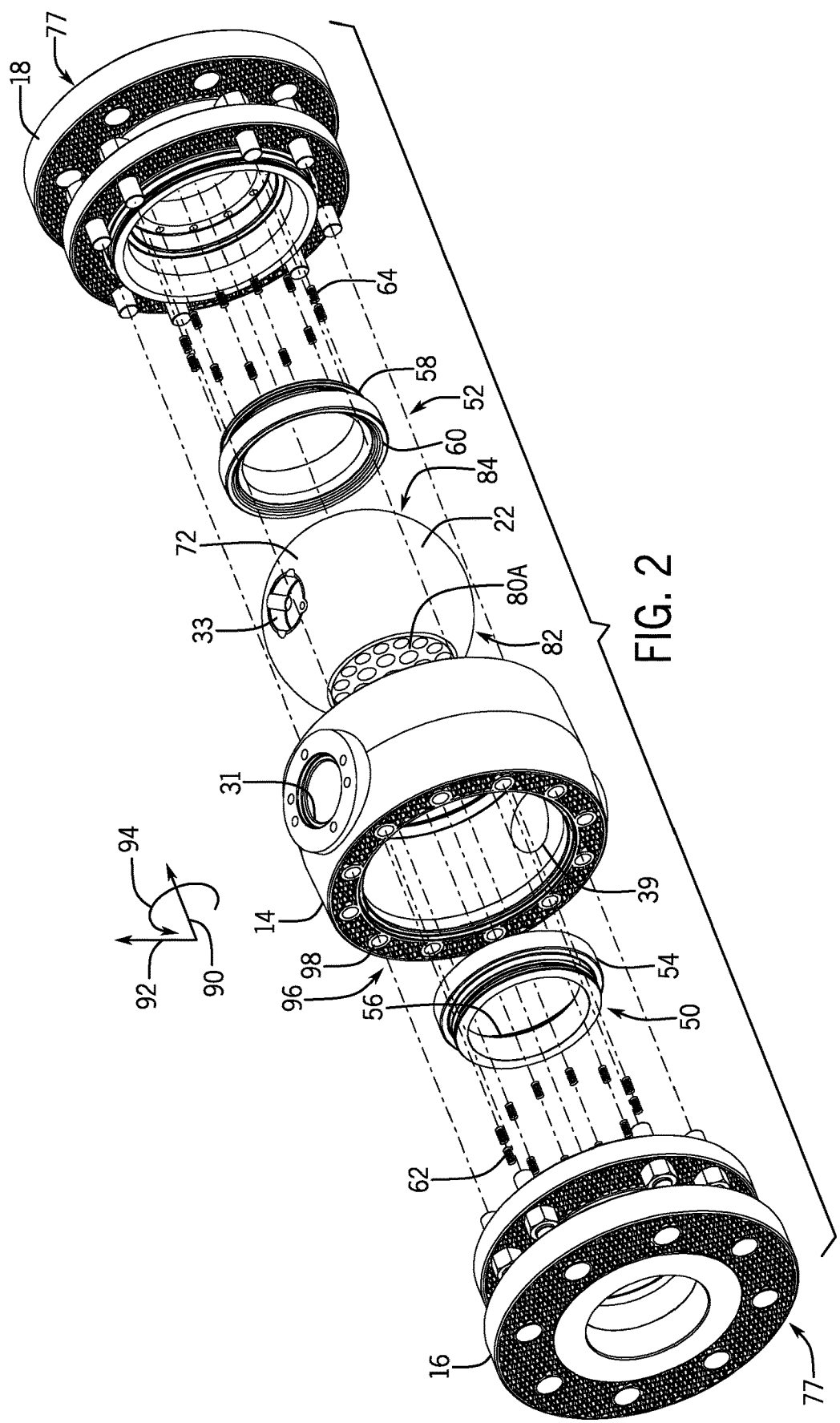
FIG. 2 is an exploded view of a portion of the ball valve of FIG. 1, in accordance with an embodiment of the present disclosure.

FIG. 2 is an exploded view of a portion of the ball valve 10 of FIG. 1. In particular, FIG. 2 illustrates the body 14, the upstream closure 16, the downstream closure 18, the ball 22, the upstream seat assembly 50 (e.g., having the seat body 54, the seal 56, and biasing members 62), and the downstream seat assembly 52 (e.g., having the seat body 58, the seal 60, and biasing members 64). The first flow conditioner 80A is shown at the upstream end 82 of the ball 22, and the ball 22 may include the second flow conditioner 80B (FIG. 1) at the downstream end 84 of the ball 22. The ball 22 includes the recess 33 that is configured to align with the opening 31 in the body 14 and to receive the stem 30 (FIG. 1) that extends through the opening 31.

As shown, the body 14 includes a lattice structure 96 (e.g., open cell lattice structure, non-solid structure, or non-continuous structure), which may have any of a variety of forms. For example, in the ball valve 10 of FIG. 2, the lattice structure 96 of the body 14 includes openings 98 (e.g., through holes) that extend along the axial axis 90 of the ball valve 10. Additionally, the closures 16, 18 include the lattice structure 77, and the ball 22 include the lattice structure 70 (FIG. 1). However, in the illustrated embodiment, the lattice structure 70 is entirely internal to and covered by the outer wall 72 and the inner wall 74 of the ball 22, and the lattice structure 70 is not visible after construction of the ball 22 is complete. It should be appreciated that one or more of the body 14, the closures 16, 18, and/or the ball 22 may be a solid component (e.g., devoid of the respective lattice structures 96, 77, 70).

Figure 3:
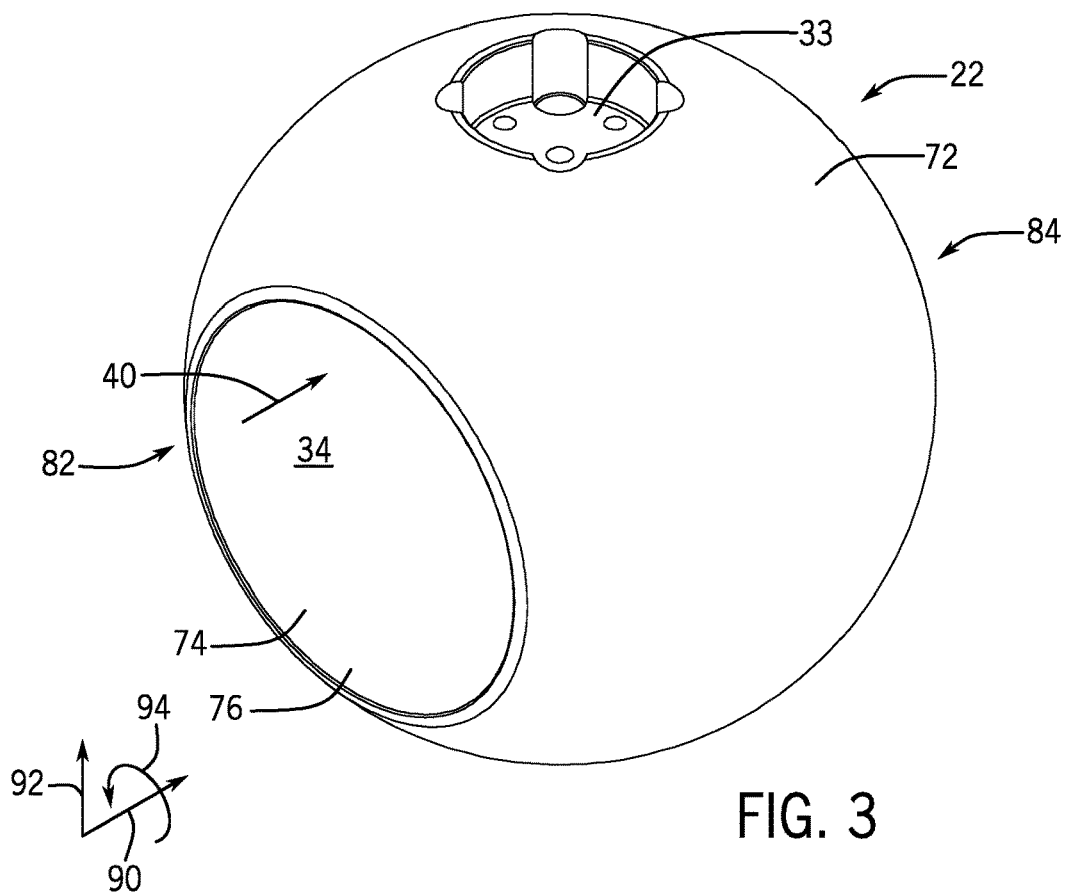
FIG. 3 is perspective view of a ball that may be used in the ball valve of FIG. 1, in accordance with an embodiment of the present disclosure.
Figure 4:
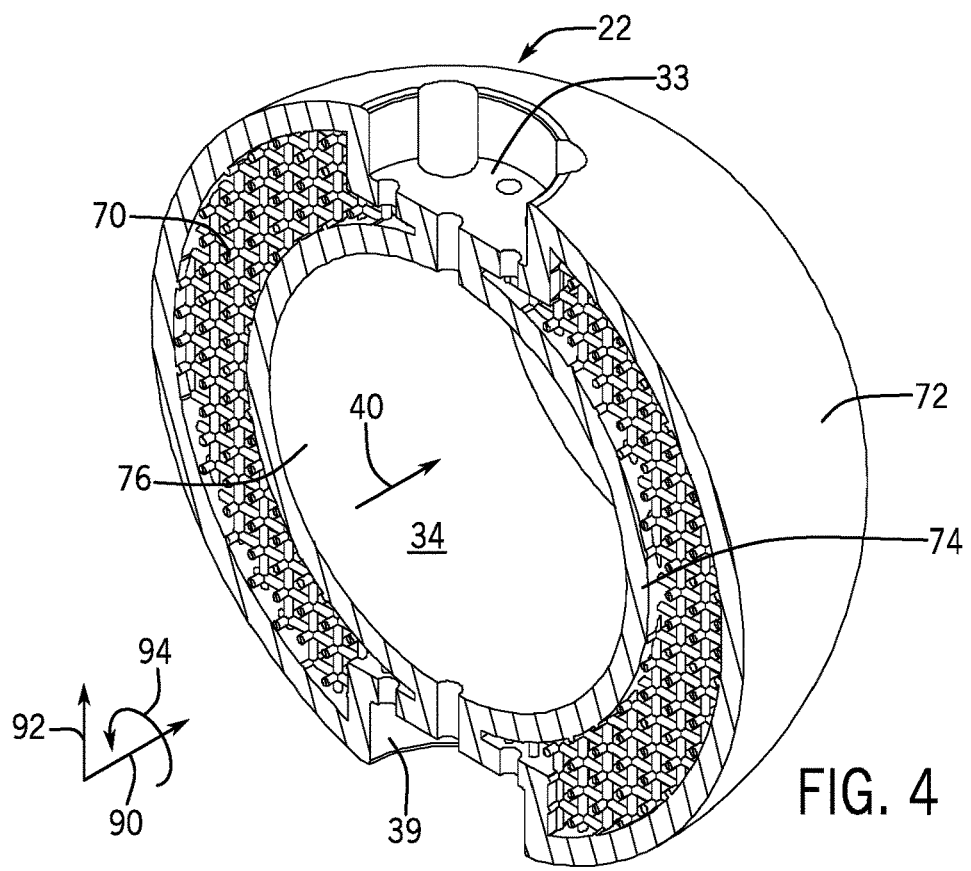
FIG. 4 is a cross-sectional perspective view of the ball of FIG. 3, in accordance with an embodiment of the present disclosure.
Figure 5:
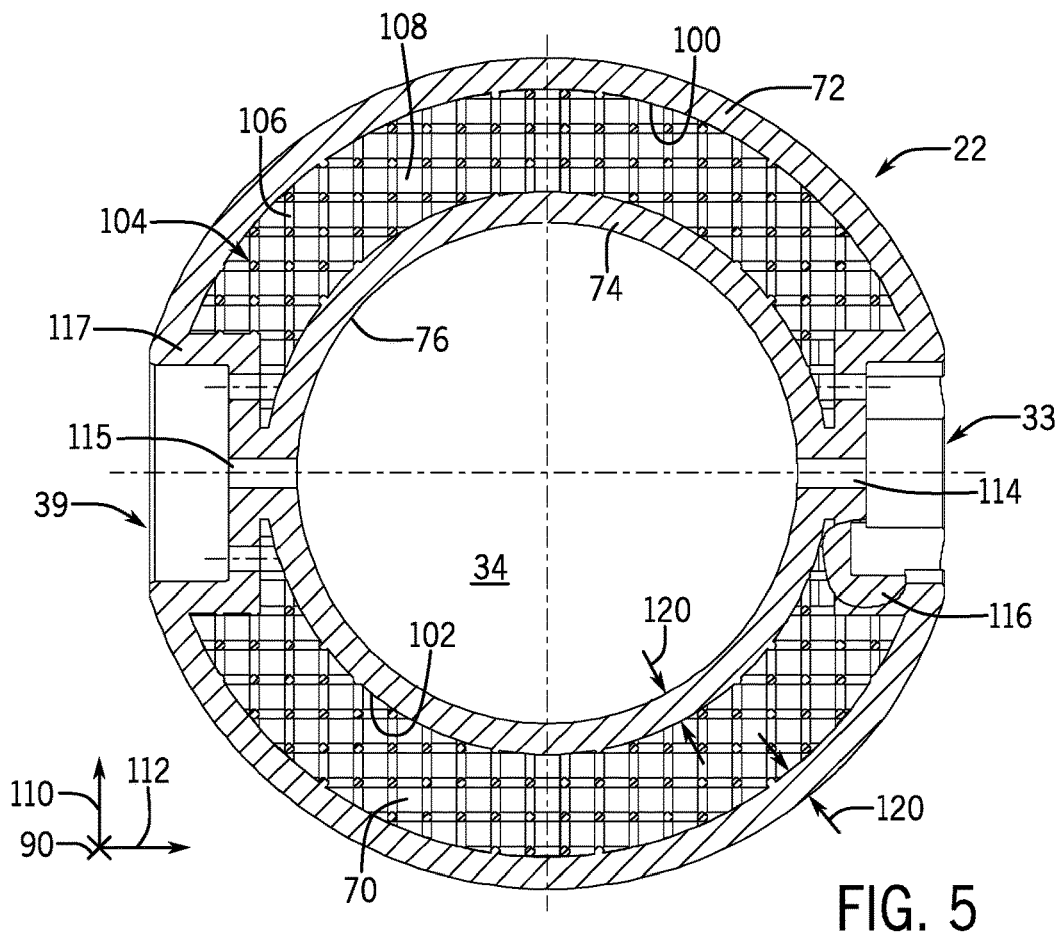
FIG. 5 is a cross-sectional side view of the ball of FIG. 3, in accordance with an embodiment of the present disclosure.
Figure 6:
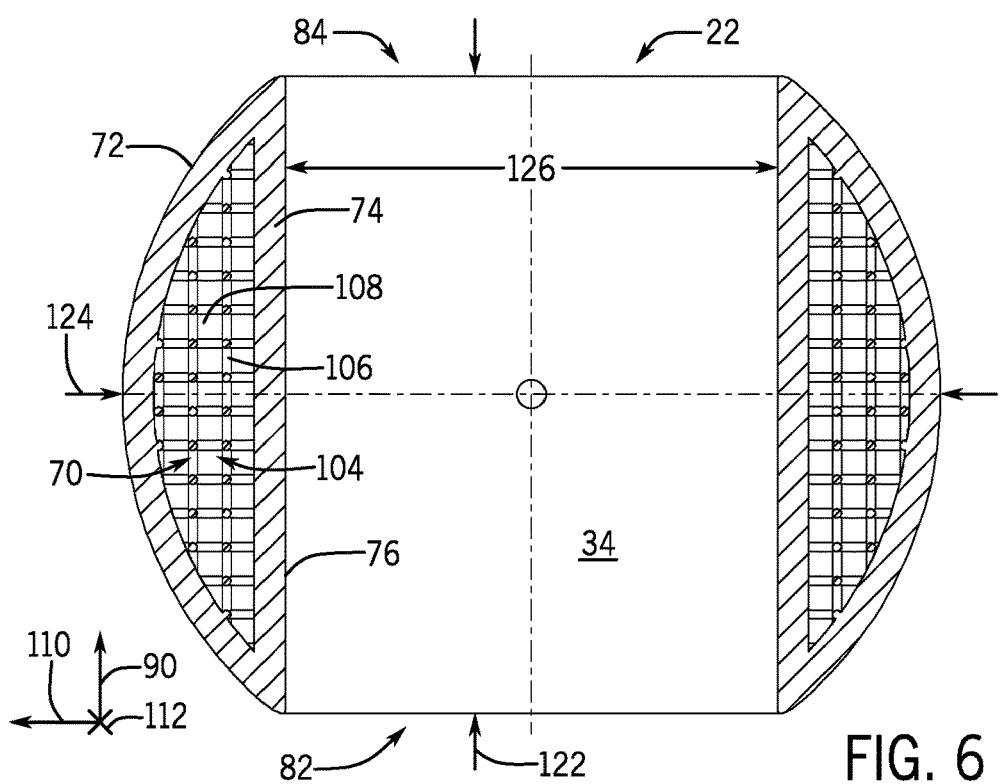
FIG. 6 is a cross-sectional top view of the ball of FIG. 3, in accordance with an embodiment of the present disclosure.

FIGS. 3-5 are various views of an embodiment of the ball 22. In particular, FIG. 3 is a perspective view and FIG. 4 is a cross-sectional perspective view of the ball 22. Additionally, FIG. 5 is a cross-sectional side view and FIG. 6 is a cross-sectional top view of the ball 22. As shown, the ball 22 includes the lattice structure 70, the outer wall 72, and the inner wall 74. The ball 22 also includes the inner surface 76 that contacts the fluid 40 that flows through the bore 34, the recess 33 that is configured to receive the stem 30 (FIG. 1), and the recess 39 that is configured to receive the trunnion 35 (FIG. 1). While the illustrated ball 22 does not include the one or more flow conditioners 80, it should be appreciated that the ball 22 may be modified to include the flow conditioners 80A, 80B or any of a variety of other flow conditioners 80 in any suitable location within the bore 34.

The outer wall 72 is generally spherical, but is shaped into a spherical shell segment or frustum (e.g., truncated in parallel planes at the upstream end 82 and the downstream end 84 to enable the fluid 40 flow through the bore 34). The inner wall 74 is generally cylindrical and is positioned radially-inwardly of the outer wall 72 to define the bore 34. As shown in FIG. 3, the lattice structure 70 is covered by the outer wall 72 and the inner wall 74. As shown in FIGS. 4-6, the lattice structure 70 extends radially across a three-dimensional and generally annular space that is defined between the outer wall 72 and the inner wall 74.

With reference to FIG. 5, the lattice structure 70 extends from an inner surface 100 (e.g., radially-inner annular surface or spherical segment) of the outer wall 72 to an outer surface 102 (e.g., radially-outer annular surface) of the inner wall 74. The lattice structure 70 includes trusses 106 (e.g., support beams, posts, bars, rods, struts) that define open spaces 108. In the illustrated embodiment, the trusses 106 are arranged to form multiple truss units 104 having a square cross-sectional shape and are arranged to form a square lattice structure. Furthermore, in the illustrated embodiment, the trusses 106 are joined to one another to form a three-dimensional grid with some trusses 106 oriented to extend along the axial axis 90, some trusses 106 oriented to extend along the lateral axis 110, and some trusses 106 oriented to extend along the vertical axis 112.

As shown in FIG. 5, the recess 33 includes an opening 114 (e.g., through hole) that is configured to receive a fastener (e.g., threaded fastener or pin) to couple the stem 30 (FIG. 1) to the ball 22. Similarly, the recess 39 includes an opening 115 (e.g., through hole) that is configured to receive a fastener (e.g., threaded fastener or pin) to couple the trunnion 35 (FIG. 1) to the ball 22. In the illustrated embodiment, the recess 33 and the opening 114 are defined by a recessed portion 116 (e.g., solid portion) of the outer wall 72, while the recess 39 and the opening 115 are defined by a recessed portion 117 (e.g., solid portion) of the outer wall 72. The recessed portions 116, 117 of the outer wall 72 may extend radially-inward to connect to the inner wall 74, thereby providing a continuous solid wall about the recesses 33, 37 and the openings 114, 115. However, it should be appreciated that the ball 22 may have various forms (e.g., different size or shape recesses 33, 37 or openings 114, 115). Thus, in some embodiments, the lattice structure 70 may circumferentially surround an entirety of the bore 34 between the upstream end 82 and the downstream end 84 of the ball 22.

Figure 7:
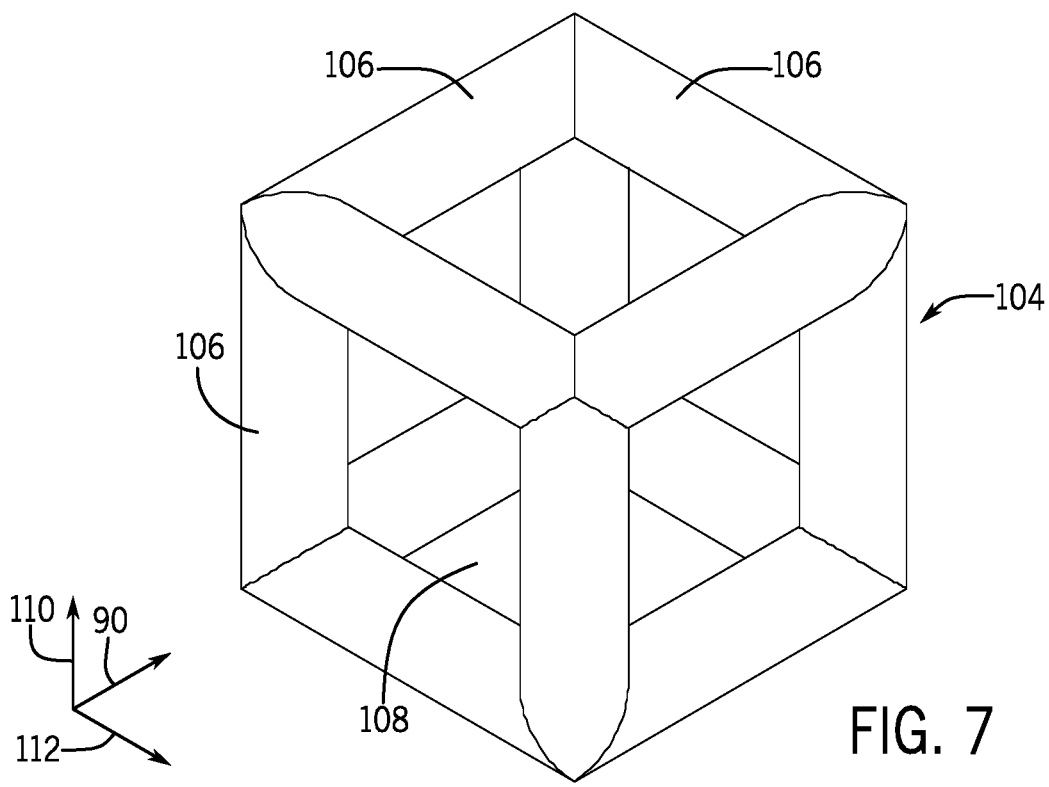
FIG. 7 is a perspective view of a portion of a square lattice structure that may be utilized in one or more components of the ball valve of FIG. 1, in accordance with an embodiment of the present disclosure.
Figure 8:
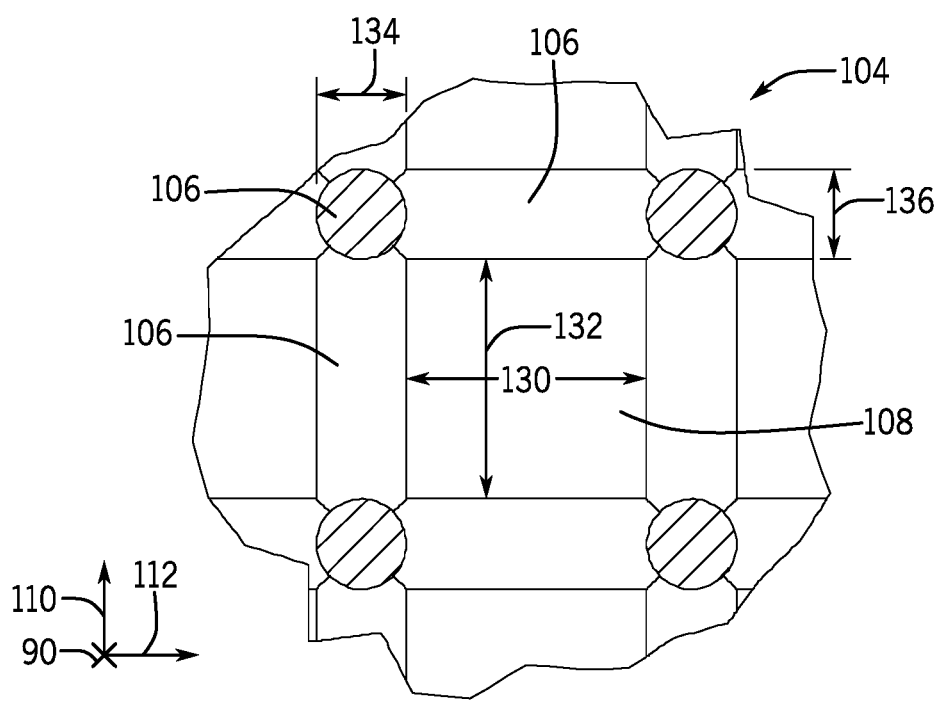
FIG. 8 is a cross-sectional side view of a portion of the square lattice structure of FIG. 7, in accordance with an embodiment of the present disclosure.

Turning to FIGS. 7 and 8, FIG. 7 illustrates a perspective view and FIG. 8 illustrates a cross-sectional side view of an embodiment of one truss unit 104 that may be part of the lattice structure 70 of the ball 22. The truss unit 104 includes the trusses 106 oriented along the axial axis 90, the lateral axis 110, and the vertical axis 112, and the trusses 106 define the open space 108. The illustrated truss units 104 may be arranged to form the square lattice structure shown in FIGS. 3-6. It should be appreciated that the truss units 104 may be used in one or more other components (e.g., the body 14, the closures 16, 18) of the ball valve 10.

It should also be appreciated that the lattice structure 70 may have any of a variety of forms. For example, the truss units 104 may have various cross-sectional shapes, such as triangles, rectangles (e.g., non-square), diamonds, pentagons, hexagons, octagons, or circles. Furthermore, the trusses 106 may be coupled to one another to form a hexagonal lattice structure, a pyramidal lattice structure, a triangular prism lattice structure, a tetrahedron lattice structure, or the like. In some embodiments, the truss units 104 that form the lattice structure 70 may have multiple different cross-sectional shapes (e.g., both hexagonal and square shapes). Furthermore, the trusses 106 of the truss units 104 may be arranged to have various orientations relative to the axial axis 90, the lateral axis 110, and the vertical axis 112.

Certain configurations reduce the weight of the ball 22 (e.g., by 10, 20, 30, 40, 50 percent or more), while maintaining adequate strength and also enabling the seat assemblies 50, 52 to seal against the ball 22 in pressure-containing components of a mineral-extraction system. For example, with reference to FIGS. 5 and 6, the outer wall 72 and the inner wall 74 may have a thickness 120 (e.g., a radial thickness that is solid and devoid of the lattice structure 70) of between approximately 1 to 10, 2 to 9, 3 to 8, or 4 to 7 millimeters (mm), a distance 122 (e.g., axial distance) between the upstream end 82 and the downstream end 84 may be between approximately 100 to 200, 125 to 175, or 130 to 150 mm, a maximum diameter 124 across a widest part of the ball 22 may be between approximately 100 to 200, 125 to 175, or 150 to 170 mm, and a diameter 126 of the bore 34 may be between approximately 50 to 150, 75 to 125, or 90 to 110 mm. With reference to FIG. 8, a vertical thickness 130 and a lateral thickness 132 of the open space 108 may be between approximately 1 to 10, 2 to 9, 3 to 8, or 4 to 6 mm, and a vertical thickness 134 and a lateral thickness 136 of each truss 106 may be between approximately 0.5 to 4, 1 to 3, or 1.5 to 2.5 mm. It should be appreciated that the trusses 106 may have a square, rectangular, circular, or any other suitable cross-sectional shape.

The dimensions provided above are intended to be exemplary, and it should be appreciated that the relative dimensions may scale with the overall size of the ball 22 and/or may vary based on the application. For example, the thickness 120 of the outer wall 72 and/or the inner wall 74 may be between approximately 1 to 25, 2 to 20, or 3 to 10 percent of the maximum diameter 124 of the ball 22. Additionally or alternatively, the vertical thickness 130 and/or the lateral thickness 132 of the open space 108 of the truss unit 104 may be between approximately 1 to 25, 2 to 20, or 3 to 10 percent of the maximum diameter 124 of the ball 22. Additionally or alternatively, the vertical thickness 130 and/or the lateral thickness 132 of the open space 108 of the truss unit 104 may be between approximately 50 to 150, 60 to 100, 70 to 90, or 75 to 80 percent of the thickness 120 of the outer wall 72 and/or the inner wall 74. Additionally or alternatively, the vertical thickness 134 and/or the lateral thickness 136 of each truss 106 may be between approximately 20 to 100, 25 to 80, or 30 to 40 percent of the vertical thickness 130 and/or the lateral thickness 132 of the open space 108 of the truss unit 104.

Figure 9:
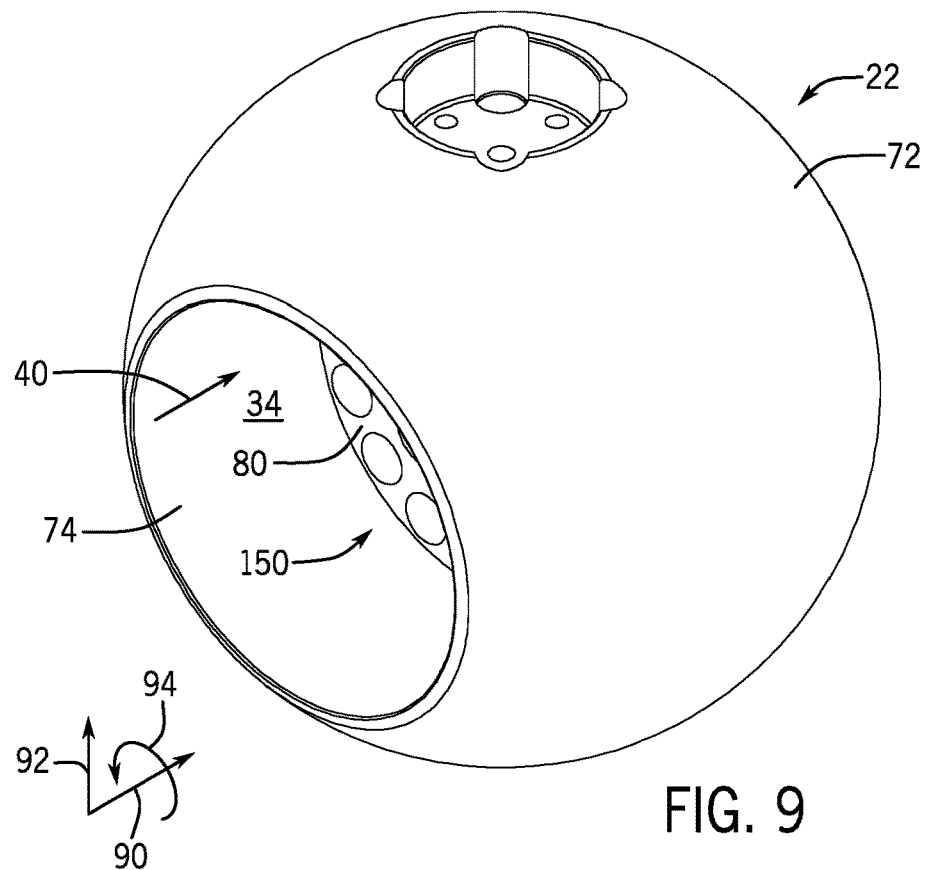
FIG. 9 is perspective view of a ball having a flow conditioner that may be used in the ball valve of FIG. 1, in accordance with an embodiment of the present disclosure.
Figure 10:
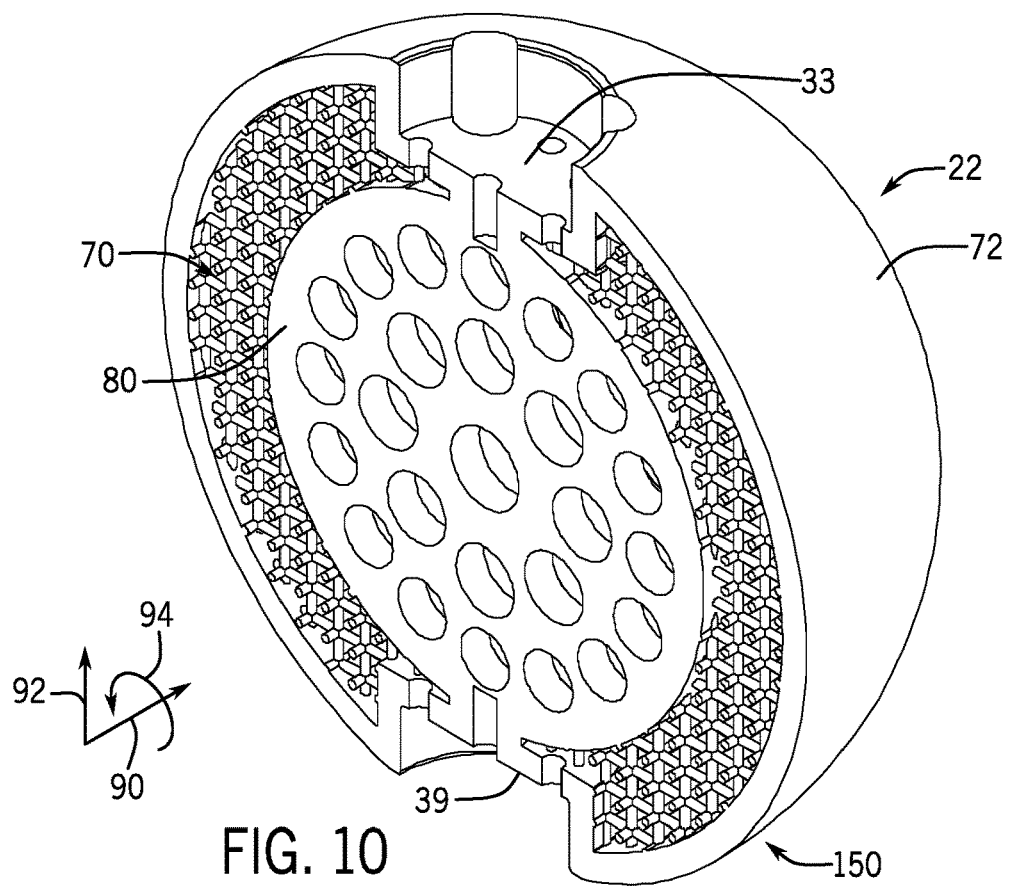
FIG. 10 is a cross-sectional perspective view of the ball of FIG. 9, in accordance with an embodiment of the present disclosure.
Figure 11:
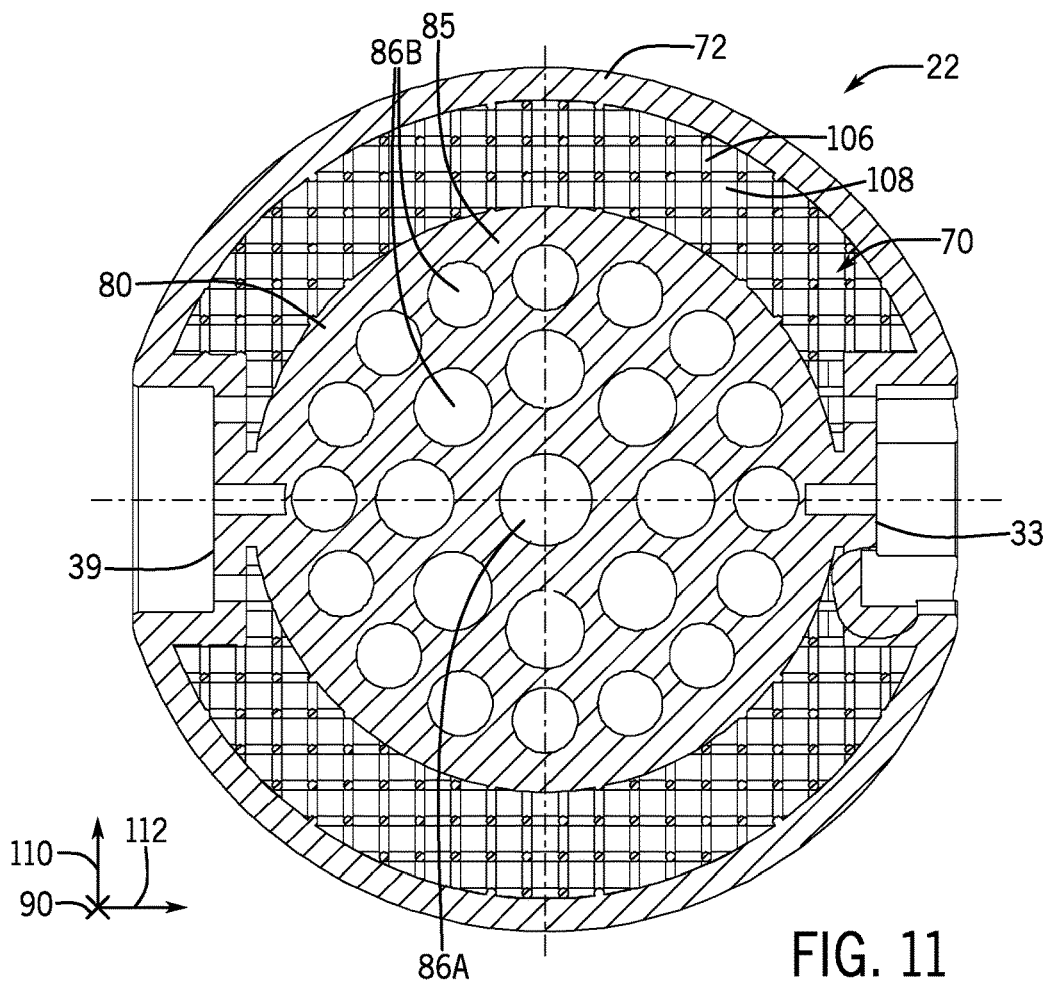
FIG. 11 is a cross-sectional side view of the ball of FIG. 9, in accordance with an embodiment of the present disclosure.
Figure 12:
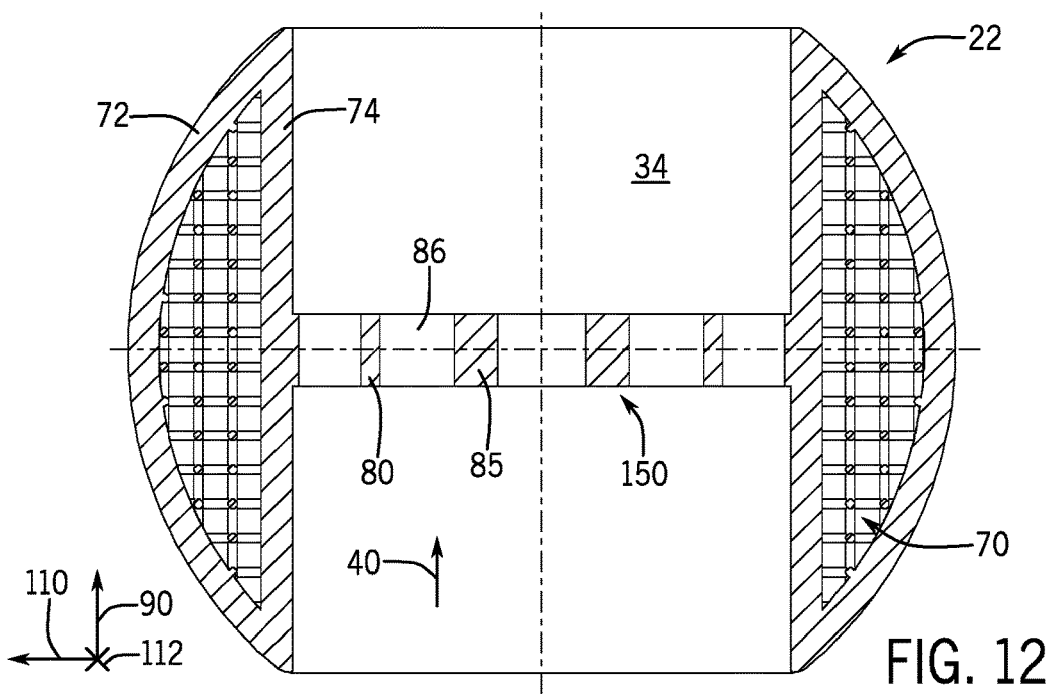
FIG. 12 is a cross-sectional top view of the ball of FIG. 9, in accordance with an embodiment of the present disclosure.

As noted above, certain embodiments may include one or more flow conditioners 80. Accordingly, FIGS. 9-12 are various views of an embodiment of the ball 22 having one flow conditioner 80 positioned in a central portion 150 of the bore 34 (e.g., at or proximate to a mid-point between the upstream end 82 and the downstream end 84 of the bore 34). In particular, FIG. 9 is a perspective view and FIG. 10 is a cross-sectional perspective view of an embodiment of the ball 22. Additionally, FIG. 11 is a cross-sectional side view and FIG. 12 is a cross-sectional top view of the 22 ball having the flow conditioner 80 in the central portion 150 of the bore 34.

As shown, the ball 22 includes the lattice structure 70 between the outer wall 72 and the inner wall 74. The lattice structure 70 is a square lattice structure having the trusses 106 that define the open space 108. However, it should be appreciated that the lattice structure 70 may have any suitable configuration, including those discussed above with respect to FIGS. 1-8, for example.

The flow conditioner 80 is coupled to the inner wall 74 and extends radially across the bore 34 to affect the flow of the fluid 40 through the bore 34. In the illustrated embodiment, the flow conditioner 80 is the plate 85 having multiple openings 86 to enable the fluid 40 to flow across the plate 85, and the plate 85 is oriented in a plane that is perpendicular to the flow of the fluid 40 and the axial axis 90. The flow conditioner 80 is integrally formed with the inner wall 74 of the ball 22, and thus the flow conditioner 80 is not coupled to the inner wall 74 via any fasteners (e.g., threaded fasteners, pins, welds). However, in some embodiments, the flow conditioner 80 may be coupled to the ball 22 via fasteners.

The illustrated plate 85 includes a central opening 86A and other openings 86B arranged circumferentially about the central opening 86A. The openings 86 may have different diameters. For example, a diameter of the central opening 86A may be greater than respective diameters of other openings 86B. In some embodiments, the diameter of the central opening 86A may be between approximately 5 to 30, 10 to 25, or 15 to 10 mm. Additionally or alternatively, the respective diameters of the other openings 86B may be approximately 50 to 90, 60 to 80, or 70 to 75 percent of the diameter of the central opening 86A. It should be appreciated that the openings 86 may have any of a variety of sizes. It should also be appreciated that the openings 86 may be provided in any of a variety of arrangements, and that the flow conditioner 80 may have any of a variety of forms (e.g., vanes extending radially-inward from the inner wall 74 or tubes extending axially through the bore 34). Furthermore, one or more plates 85 each having a similar or different arrangement of openings 86 may be positioned at any location within the bore 34 (e.g., between the upstream end 82 and the central portion 150 and/or between the downstream end 84 and the central portion 84).

Figure 13:
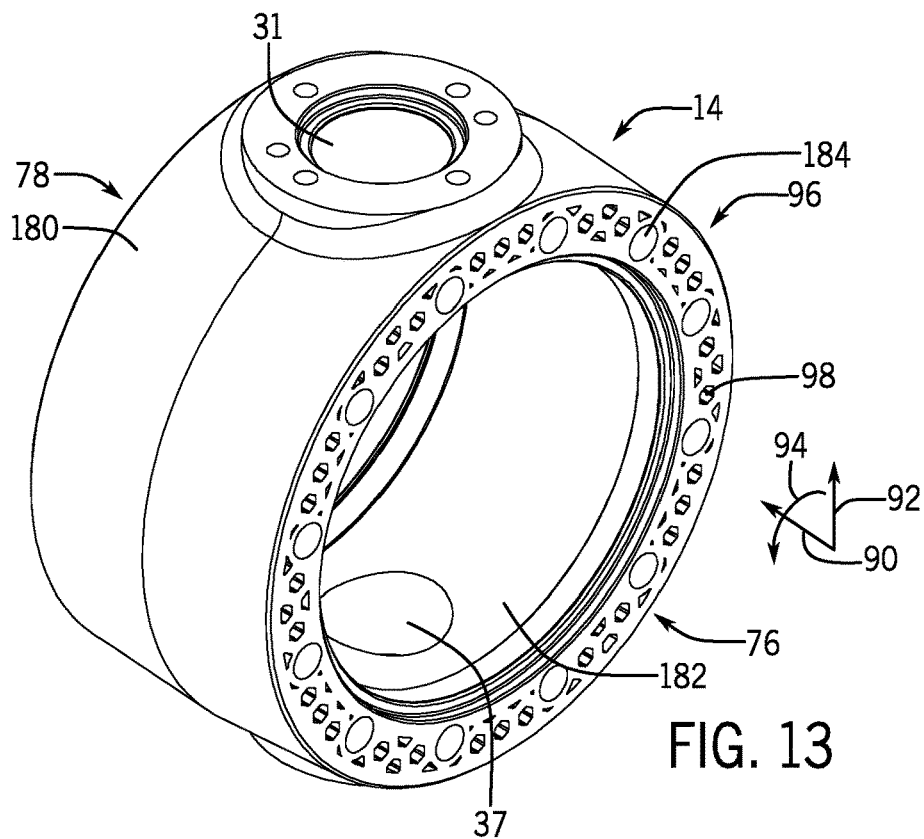
FIG. 13 is a cross-sectional perspective view of a body that may be used in the ball valve of FIG. 1, in accordance with an embodiment of the present disclosure.
Figure 14:
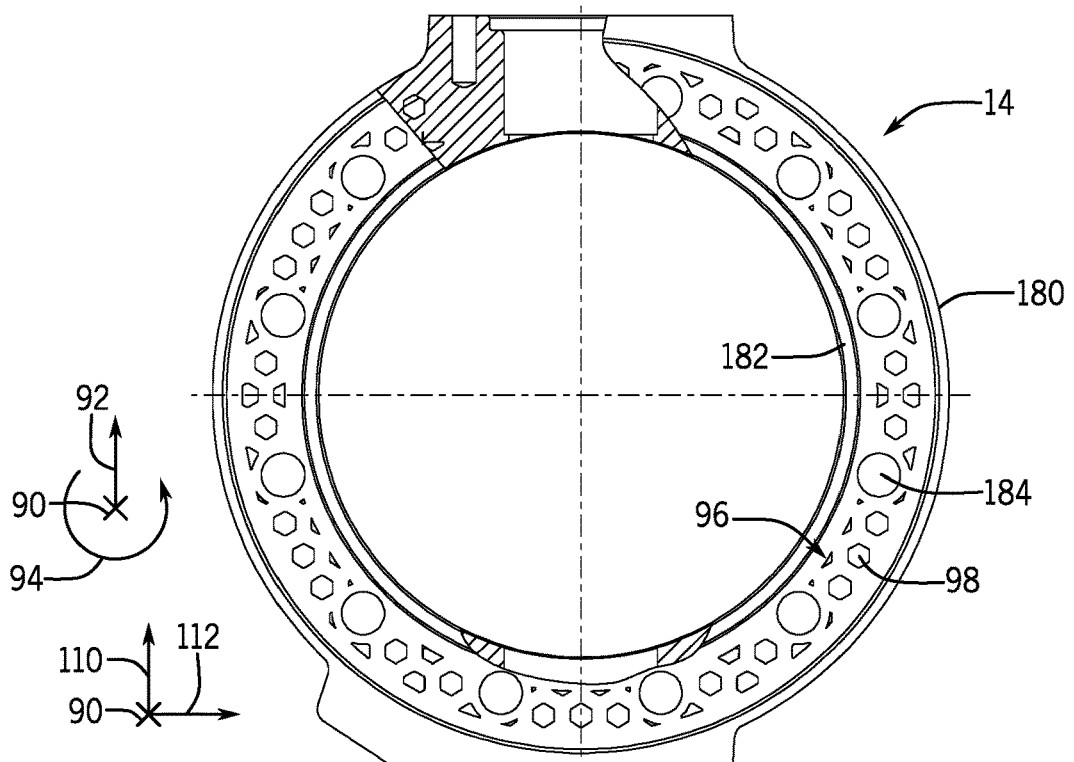
FIG. 14 is a cross-sectional side view of the body of FIG. 13, in accordance with an embodiment of the present disclosure.

As noted above with respect to FIGS. 1 and 2, the ball valve 10 may additionally or alternatively include the body 14 having the lattice structure 96. Accordingly, FIG. 13 is a perspective view and FIG. 14 is a side view of an embodiment of the body 14 having the lattice structure 96. In the illustrated embodiment, the lattice structure 96 of the body 14 includes the openings 98 that extend along the axial axis 90 of the body 14 (e.g., a central longitudinal axis of the openings 98 is parallel to the axial axis 90 of the body 14). As shown, the openings 98 are through holes that extend from an upstream end 76 (e.g., edge or axially-facing annular surface) of the body 14 to a downstream end 78 (e.g., edge or axially-facing annular surface) of the body 14, and at least some of the openings 98 have a hexagonal cross-sectional shape.

Figure 15:
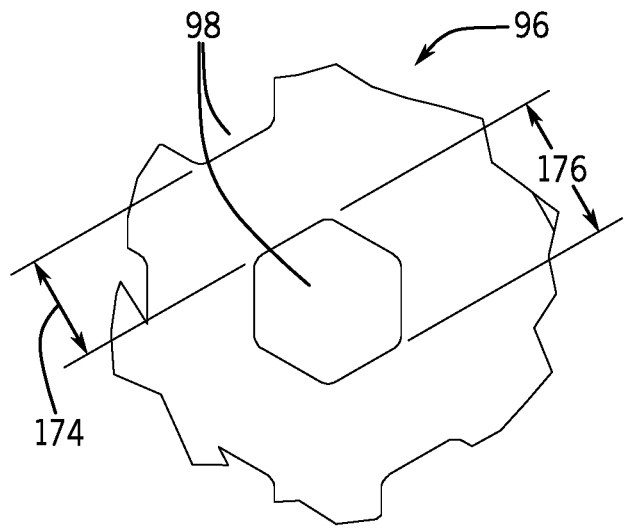
FIG. 15 is a side view of a portion of a lattice structure having openings with hexagonal cross-sectional shapes that may be utilized in one or more components of the ball valve of FIG. 1, in accordance with an embodiment of the present disclosure.

With the foregoing in mind, FIG. 15 shows an embodiment of a portion of the lattice structure 96 having openings 98 with hexagonal cross-sectional shapes. As shown, adjacent openings 98 may be separated by a width 174 (e.g., along the circumferential axis 94) that is between approximately 1 to 10, 2 to 8, or 5 to 6 mm, and a width 176 (e.g., along the circumferential axis 96) of the opening 98 may be between approximately 1 to 10, 3 to 9, or 5 to 8 mm. The width 174 may be may be approximately 10 to 150, 30 to 100, 60 to 80 or 65 to 75 percent of the width 176.

Figure 16:
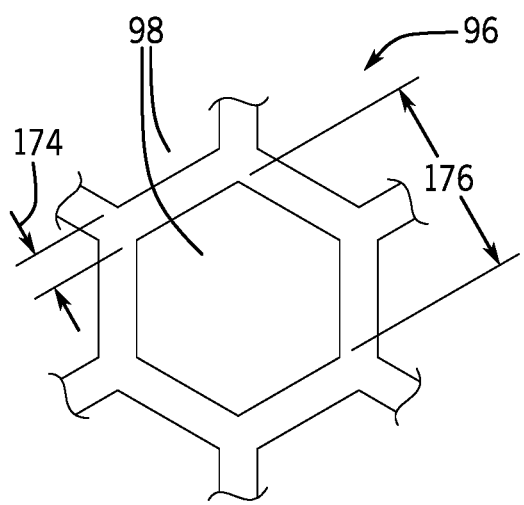
FIG. 16 is side view of a portion of another lattice structure having openings with hexagonal cross-sectional shapes that may be utilized in one or more components of the ball valve of FIG. 1, in accordance with an embodiment of the present disclosure.
Figure 17:
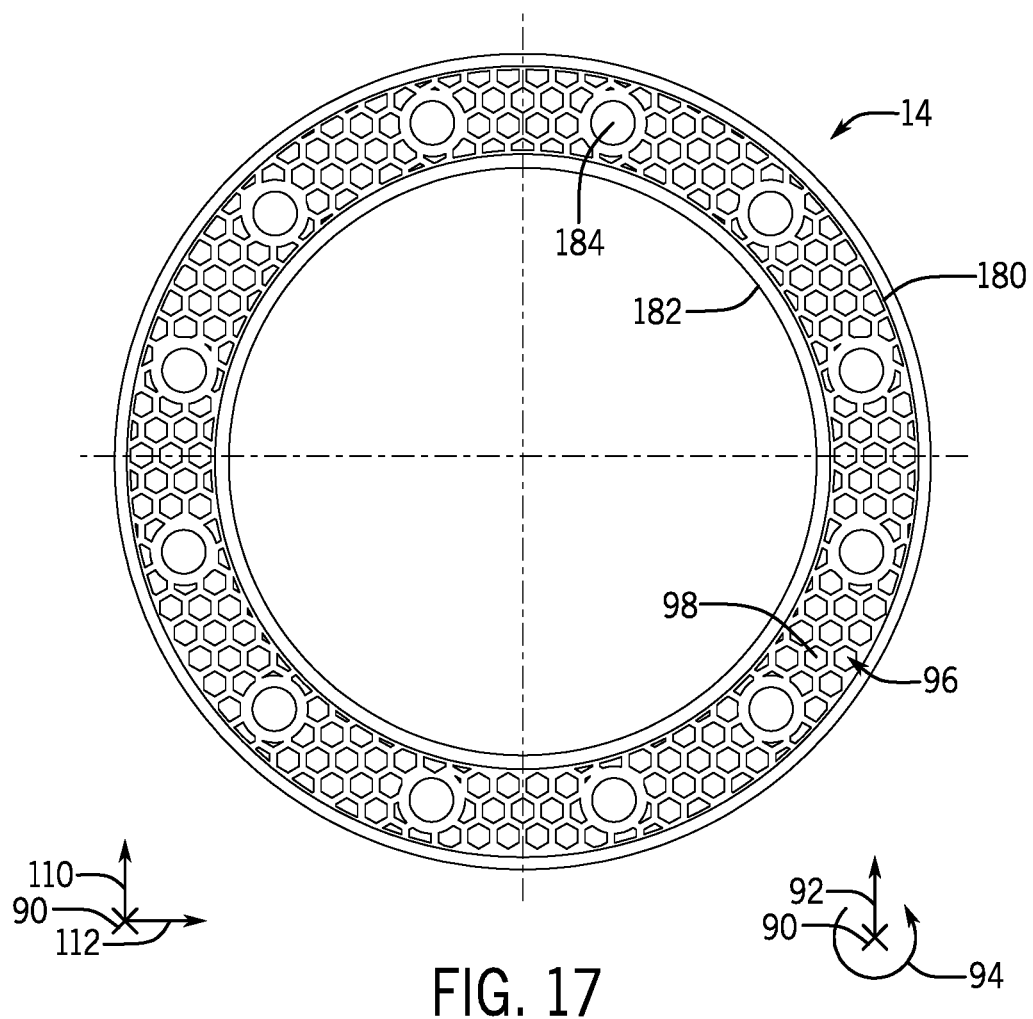
FIG. 17 is a cross-sectional side view of a body having the another lattice structure of FIG. 16 that may be used in the ball valve of FIG. 1, in accordance with an embodiment of the present disclosure.

FIG. 16 illustrates another embodiment of the lattice structure 96 having openings 98 with a hexagonal cross-sectional shape with different dimensions (e.g., widths 174, 176), as compared to FIG. 15). Additionally, FIG. 17 is a cross-sectional side view of an embodiment of the body 14 having the lattice structure 96 with the openings 98 of FIG. 16.

The body 14 and the lattice structure 98 shown in FIGS. 13-17 are merely exemplary. It should be appreciated that the openings 98 may not be through holes and/or may have any of a variety of cross-sectional shapes, such as squares, triangles, rectangles (e.g., non-square), diamonds, pentagons, octagons, or circles. Furthermore, the lattice structure 96 of the body 14 may be designed to include some or all of the features of the lattice structure 70 described above with respect to the ball 22 (e.g., include the trusses 106 that define the open spaces 108 in a square lattice structure or other type of lattice structure). It should be appreciated that the openings 98 may be arranged to have various orientations relative to the axial axis 90, the lateral axis 110, and the vertical axis 112.

As shown in FIGS. 13, 14, and 16, the lattice structure 96 may be in an interior portion of the body 14 and may extend between an outer wall 180 (e.g., solid wall, radially-outer annular wall, cylindrical wall) and an inner wall 182 (e.g., solid wall, radially-inner annular wall, cylindrical wall). In the illustrated embodiment, the lattice structure 96 is entirely internal to and covered by the outer wall 182 and the inner wall 182, such that the lattice structure 96 is not visible after the body 14 is coupled to the upstream closure 16 and downstream closure 18 via fasteners (e.g., fasteners 20 of FIG. 1) that may be inserted into the openings 184 that are arranged circumferentially about the body 14.

Figure 18:
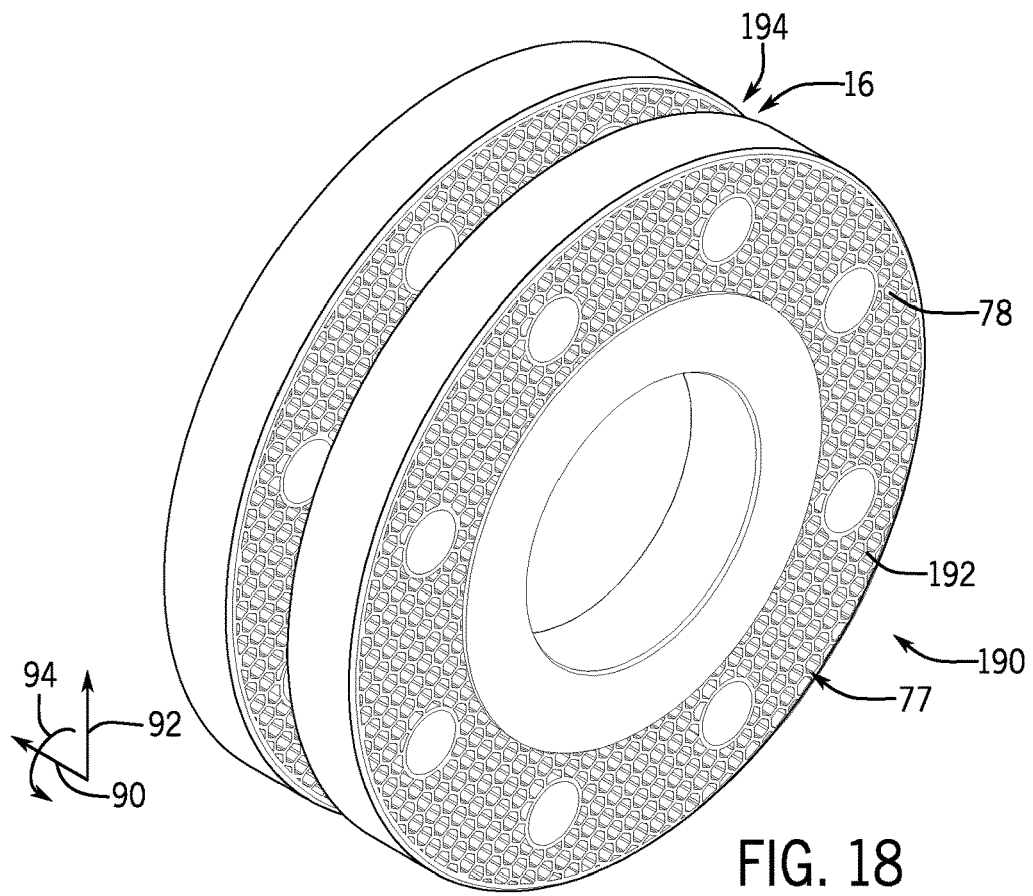
FIG. 18 is a perspective view of a closure that may be used in the ball valve of FIG. 1, in accordance with an embodiment of the present disclosure.
Figure 19:
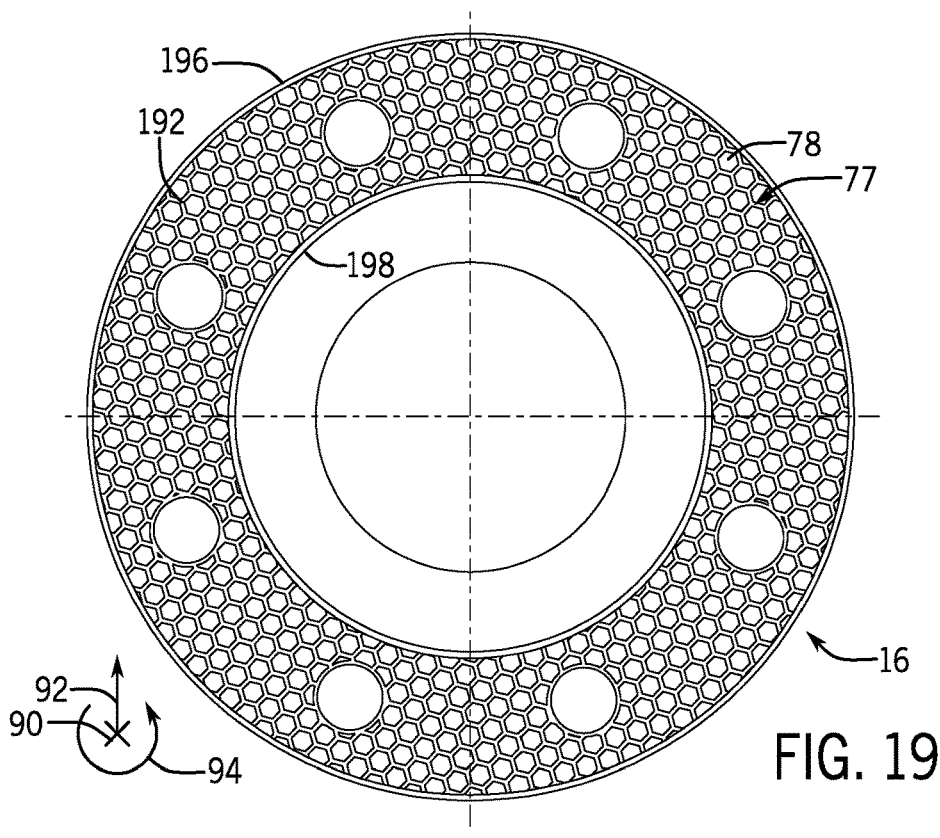
FIG. 19 is a side view of a portion of the closure of FIG. 18, in accordance with an embodiment of the present disclosure.
Figure 20:
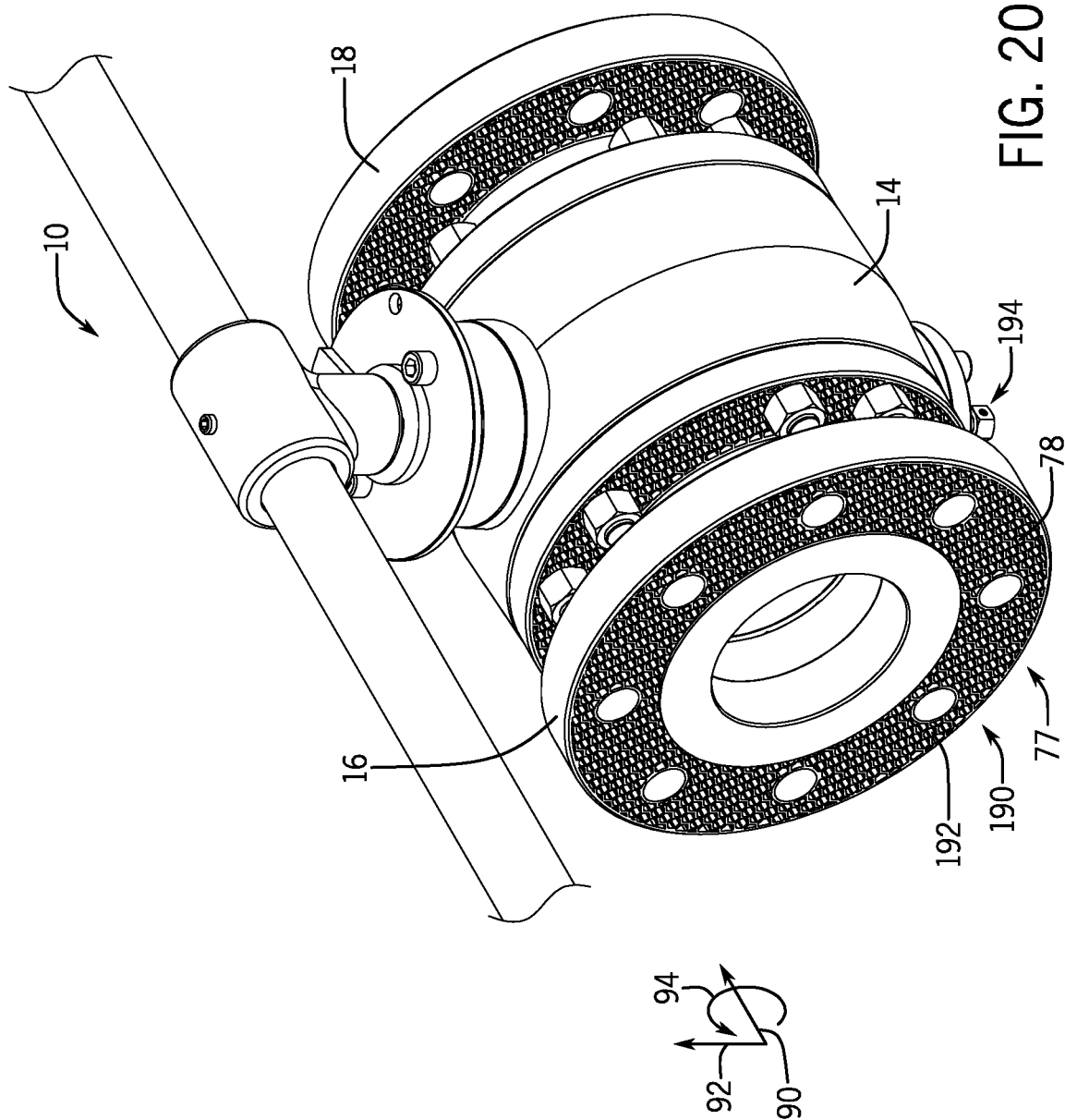
FIG. 20 is a perspective view of the ball valve of FIG. 1, in accordance with an embodiment of the present disclosure.

As noted above with respect to FIGS. 1 and 2, the ball valve 10 may additionally or alternatively include the closures 16, 18 having the lattice structure 77. Accordingly FIG. 18 is a perspective view of an embodiment of the upstream closure 16 having the lattice structure 77, and FIG. 19 is a cross-sectional side view of a portion of the upstream closure 16 having the lattice structure 77. FIG. 20 is a perspective of an embodiment of the ball valve 10 in which the upstream closure 16 and the downstream closure 18 include the lattice structure 77.

As shown, the lattice structure 77 has the openings 78 that extend along the axial axis 90 (e.g., a central longitudinal axis of the openings 78 is parallel to the axial axis 90 of the upstream closure 16). The openings 78 may be through holes that extend across each portion of the upstream and downstream closures 16, 18. For example, some of the openings 78 may extend from an upstream end 190 (e.g., edge or axially-facing annular surface) of an upstream plate 192 of the upstream closure 16 to a downstream end 194 (e.g., edge or axially-facing annular surface) of the upstream plate 192 of the upstream closure 190. In the illustrated embodiment, at least some of the openings 78 have a hexagonal cross-sectional shape.

The body 14 and the lattice structure 77 shown in FIGS. 18-20 are merely exemplary. It should be appreciated that the openings 78 may not be through holes and/or may have any of a variety of cross-sectional shapes, such as squares, triangles, rectangles (e.g., non-square), diamonds, pentagons, octagons, or circles. Furthermore, the lattice structure 78 of the body 14 may be designed to include some or all of the features of the lattice structure 96 described above with respect to the body 14 (e.g., FIGS. 15 and 16) or the lattice structure 70 described above with respect to the ball 22 (e.g., include the trusses 106 that define the open spaces 108 in a square lattice structure or other type of lattice structure). It should be appreciated that the openings 78 may be arranged to have various orientations relative to the axial axis 90, the lateral axis 110, and the vertical axis 112.

As shown, the lattice structure 77 may be in an interior portion of the closures 16, 18. For example, the lattice structure 77 may extend between an outer wall 196 (e.g., solid wall, radially-outer annular wall, cylindrical wall) and an inner wall 198 (e.g., solid wall, radially-inner annular wall, cylindrical wall) of the upstream plate 192 of the upstream closure 16. In the illustrated embodiment, at least some of the lattice structure 77 is visible after the construction of the ball valve 10 is complete. However, in some embodiments, some or all of the lattice structure 77 may be entirely internal to and covered by the outer wall 196 and the inner wall 198, such that the lattice structure 77 is not visible after the closures 16, 18 are coupled to the body 14 via the fasteners 20.

Figure 21:
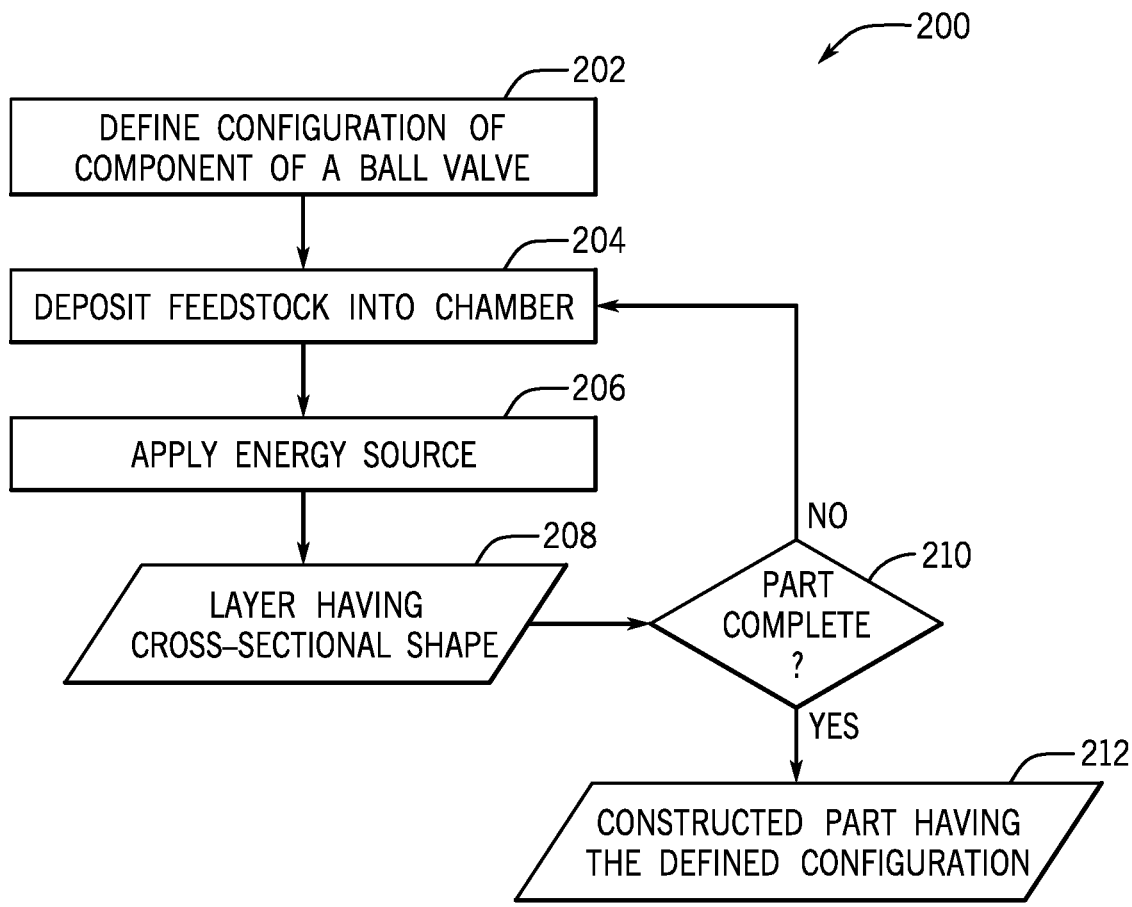
FIG. 21 is a method of manufacturing the ball valve of FIG. 1, in accordance with an embodiment of the present disclosure.

FIG. 21 is a flow diagram of a method 200 that may be used to manufacture the ball 22 of the ball valve 10. The method 200 includes steps for constructing the ball 22 using an additive manufacturing process (e.g., 3-D printing, such as laser metal deposition). The method 200 may be performed by an additive manufacturing system, which may include a controller (e.g., electronic controller), a processor, a memory device, a user interface, and/or an energy source.

The method 200 includes defining a particular configuration or shape for the ball 22, in step 202. The configuration may be a computer-generated three-dimensional representation of the ball 22 and may be programmed by an operator into an additive manufacturing system by using a specialized or general purpose computer having the processor, for example. The defined configuration may have any of the shapes and features described above. For example, the ball 22 may include the lattice structure 70 and/or one or more flow conditioners 80.

In step 204, feedstock (e.g., a metal powder or wire) is deposited into a chamber, such as a vacuum chamber. Any of a variety of materials may used in any suitable combination, including those described in more detail below. In step 206, an energy source, such a laser or electron beam, is applied to the deposited feedstock to melt or otherwise consolidate the feedstock. As shown at block 208, a consolidated layer having a cross-sectional shape corresponding to the configuration defined in step 202 is formed. The processor or operator may determine whether the ball 22 is incomplete or complete, in step 210. If the part is incomplete, then steps 204 and 206 are repeated to produce layers of consolidated feedstock having cross-sectional shapes corresponding to the defined confirmation or model until construction of the ball 22 is complete. Thus, the energy source is applied to melt or otherwise consolidate each newly deposited portion of the feedstock until the final product is complete and the ball 22 having the defined configuration is produced, as shown in step 212.

The ball 22 constructed at step 212 via the method 200 may be devoid of welds or welded bonds. The ball 22 constructed at step 212 via the method 200 may be used in the ball valve 10 within a mineral extraction system without further processing (e.g., without subsequent machining, smoothing, or heat and pressure treatments, such as hot isostatic pressing) of the ball 22. However, in some embodiments, the ball 22 constructed at step 212 may be machined (e.g., to smooth or to shape the outer wall 72 and the inner wall 74). Additionally or alternatively, in some embodiments, the ball 22 may be compacted via a heat and pressure treatment, such as a hot isostatic pressing process. In such cases, the ball 22 may be positioned within a canister. The ball 22 produced via the method 200 may have characteristics (e.g., density and/or porosity) that enable the ball 22 to maintain its shape during the hot isostatic pressing process. The canister may be sealed and vacuumed, and heat and/or pressure is applied to the ball 22 within the canister via a heat source and/or a pressure source (e.g., an autoclave furnace) to compact the ball 22 (e.g., further reduce porosity of the ball 22). In certain embodiments, the temperature applied to the ball 22 within the canister may be approximately 1050 to 1100 degrees Celsius, and the hydrostatic pressure within the canister may be approximately 400 to 450 MPa. However, any suitable temperature and/or pressure may be utilized to compact the ball 22.

While the method 200 is described with reference to the ball 22 to facilitate discussion, it should be appreciated that the method 200 may be adapted to manufacture the body 14, the closures 16, 18, and/or some or all of the other components (e.g., the stem 30, the trunnion 35) of the ball valve 10. Furthermore, the method 200 or other additive manufacturing processes may be utilized to manufacture the ball 22, the body 14, the closures 16, 18, and/or some or all of the other components of the ball valve 14 with or without lattice structures (e.g., the method 200 may be utilized to manufacture solid components). Constructing components of the ball valve 10 via the method 200 may enable the components to be manufactured efficiently and/or on-site at the location where the components will be utilized. For example, the components may be manufactured via the method 200 via the additive manufacturing system on an offshore rig of a subsea mineral extraction system.

The ball valve 10 disclosed herein may have a reduced weight, while maintaining adequate structural integrity and also enabling the seat assemblies 50, 52 to seal against the ball 22 when used in mineral-extraction systems. For example, the ball valve 10 having the ball 22, the body 14, and/or the closures 16, 18 with the corresponding lattice structures 70, 77, 96 may demonstrate stress and plastic strain below allowable limits, thereby providing protection against failures, such as cracks and plastic collapse, when used in mineral extraction systems.

As noted above, the ball valve 10 disclosed herein may be utilized in SBB configurations and/or in DBB configurations. In particular, in SBB configurations, the upstream seat assembly 50 forms an adequate seal with the ball 22 having the lattice structure 70, and furthermore, the stress on the ball 22 and the upstream seat assembly 50 are within the yield strength of the materials used for the components. In DBB configurations, both the upstream seat assembly 50 and downstream seat assembly 52 adequately seal against the ball 22 having the lattice structure 70, and furthermore, the stress on the ball 22, the upstream seat assembly 50, and the downstream seat assembly 52 are within the yield strength of the materials used for the components. In some cases, the ball 22 may deform to facilitate adequate sealing. In some cases, the one or more flow conditioners 80 may stabilize and/or add rigidity and strength to the ball 22 having the lattice structure 70, thereby facilitating adequate sealing or operation of the ball valve 10.

The components (e.g., the ball 22, the body 14, the closures 16, 18) of the ball valve 10 may be formed from any of a variety of materials. For example, some or all of the portions of the ball 22, the body 14, and/or the closures 16, 18 may be formed from a nickel-based alloy (e.g., Inconel 718) or a stainless steel material (e.g., martensitic precipitation hardened stainless steel, such as 17-4 PH). In some embodiments, some or all of the portions of the ball 22, the body 14, and/or the closures 16, 18 may be devoid of any other materials (e.g., the portions only include a nickel-based alloy or a stainless steel material). It should be appreciated that different portions of the ball 22, the body 14, and/or the closures 16, 18 may be formed from different materials (e.g., the lattice structure 70 may be formed from a different material than the outer wall 72 and/or the inner wall 74 of the ball 22). In some embodiments, the ball 22, the body 14, and/or the closures 16, 18 may be formed from a material having a yield strength of between approximately 700 and 1000 Newtons per square millimeter ($N/mm^2$) at room temperature.

While the disclosure may be susceptible to various modifications and alternative forms, specific embodiments have been shown by way of example in the drawings and have been described in detail herein. However, it should be understood that the disclosure is not intended to be limited to the particular forms disclosed. Rather, the disclosure is to cover all modifications, equivalents, and alternatives falling within the spirit and scope of the disclosure as defined by the following appended claims. It should be appreciated that any of the features illustrated in FIGS. 1-21 or disclosed herein may be combined in any combination.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A ball for use within a ball valve, comprising:
   an outer wall;
   an inner wall that defines a central bore; and
   a first lattice structure positioned within an interior space defined between the outer wall and the inner wall, wherein the first lattice structure comprises a grid of cells interconnected with one another and coupled to the inner and outer walls along the central bore at least in a central area midway between opposite ends of the central bore, and the grid of cells comprises a plurality of cells disposed one after another in a first direction from the outer wall to the inner wall,
   wherein the first lattice defines a plurality of open spaces within the grid of cells, the open spaces arranged parallel with the central bore of the inner wall, and
   wherein at least some of the open spaces extend within the interior space between inner surfaces of the outer wall.

2. The ball of claim 1, wherein the first lattice structure comprises a square lattice structure.

3. The ball of claim 1, wherein the first lattice structure comprises a hexagonal lattice structure, a pyramidal lattice structure, a triangular prism lattice structure, or a tetrahedron lattice structure.

4. The ball of claim 1, wherein the grid of cells of the first lattice structure is coupled to the inner and outer walls along an entire length of the central bore.

5. The ball of claim 1, wherein the first lattice structure is entirely internal to the outer wall and the inner wall.

6. The ball of claim 1, wherein a thickness of the outer wall is between approximately 1 to 25 percent of a maximum diameter of the ball.

7. The ball of claim 1, comprising one or more flow conditioners positioned within the central bore, wherein the one or more flow conditioners are integrally formed with the ball.

8. The ball of claim 7, wherein the one or more flow conditioners comprise one flow conditioner positioned at a central portion of the central bore.

9. A ball valve, comprising:
a housing; and
a ball positioned within the housing and configured to rotate to adjust the ball valve between an open position and a closed position, wherein the ball comprises an outer wall, an inner wall that defines a central bore that enables fluid flow across the ball valve while the ball valve is in the open position, and a first lattice structure that extends between the outer wall and the inner wall;
wherein the first lattice structure comprises a grid of cells interconnected with one another and coupled to the inner and outer walls along the central bore at least in a central area midway between opposite ends of the central bore, and the grid of cells comprises a plurality of cells disposed one after another in a first direction from the outer wall to the inner wall,
wherein the grid of cells defines a plurality of open spaces therein, the open spaces arranged parallel with the central bore of the inner wall, and
wherein at least some of the open spaces extend within the interior space between inner surfaces of the outer wall.

10. The ball valve of claim 9, wherein the housing comprises a body, an upstream closure, and a downstream closure, and at least one of the body, the upstream closure, and the downstream closure comprises a second lattice structure.

11. The ball valve of claim 10, wherein the second lattice structure comprises through holes, wherein the through holes of the second lattice structure are parallel with the open spaces of the first lattice structure when the valve is in the open position.

12. The ball valve of claim 9, wherein the first lattice structure comprises a square lattice structure or a hexagonal lattice structure.

13. The ball valve of claim 11, wherein each of the through holes extends in an axial direction along a central axis of a fluid flow bore through the housing, the ball is configured to rotate to position the central bore into alignment with the fluid flow bore in the open position, and the ball is configured to rotate to position the central bore out of alignment with the fluid flow bore in the closed position.

14. The ball valve of claim 9, wherein the grid of cells of the first lattice structure is coupled to the inner and outer walls along an entire length of the central bore.

15. The ball valve of claim 9, wherein the grid of the cells comprises a first plurality of trusses extending in the first direction, a second plurality of trusses extending in a second direction crosswise to the first direction, and a third plurality of trusses extending in a third direction crosswise to the first and second directions.

16. The ball valve of claim 1, wherein the grid of the cells comprises a first plurality of trusses extending in the first direction, a second plurality of trusses extending in a second direction crosswise to the first direction, and a third plurality of trusses extending in a third direction crosswise to the first and second directions.

17. A system, comprising:
a ball valve configured to mount in a valve body having a fluid passage, wherein the ball valve is configured to move between an open position and closed position in the valve body, wherein the ball valve comprises:
an outer wall;
an inner wall that defines a central bore, the central bore interconnected with the fluid passage when the ball valve is in the open position; and
a lattice structure positioned within an interior space defined between the outer wall and the inner wall, wherein the lattice structure comprises a grid of cells interconnected with one another and coupled to the inner and outer walls along the central bore at least in a central area midway between opposite ends of the central bore, and the grid of cells comprises a plurality of cells disposed one after another in a first direction from the outer wall to the inner wall, the grid of cells defining open spaces therebetween, wherein the open spaces are parallel to the central bore of the inner wall, and
wherein at least some of the open spaces extend within the interior space between inner surfaces of the outer wall.

18. The system of claim 17, wherein the grid of the cells comprises a first plurality of trusses extending in the first direction and a second plurality of trusses extending in a second direction crosswise to the first direction, wherein the grid of the cells comprises a third plurality of trusses extending in a third direction crosswise to the first and second directions.

19. The system of claim 17, wherein the grid of the cells of the lattice structure is coupled to the inner and outer walls along an entire length of the central bore.

20. The system of claim 17, comprising the valve body having a second lattice structure, wherein the second lattice structure comprises a plurality of holes extending in an axial direction along a central axis of a fluid flow bore through the valve body.

* * * * *